United States Patent
Matsunaga et al.

(10) Patent No.: US 9,153,989 B2
(45) Date of Patent: Oct. 6, 2015

(54) POWER MONITORING SYSTEM AND ELECTRIC VEHICLE

(75) Inventors: Takanori Matsunaga, Chiyoda-ku (JP); Yoichi Okubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 409 days.

(21) Appl. No.: 13/613,354

(22) Filed: Sep. 13, 2012

(65) Prior Publication Data
US 2013/0311017 A1  Nov. 21, 2013

(30) Foreign Application Priority Data
May 17, 2012  (JP) .................................. 2012-113217

(51) Int. Cl.
*B60L 9/00* (2006.01)
*B60L 11/00* (2006.01)
(Continued)

(52) U.S. Cl.
CPC ............... *H02J 7/0055* (2013.01); *B60L 1/003* (2013.01); *B60L 3/00* (2013.01); *B60L 3/12* (2013.01);
(Continued)

(58) Field of Classification Search
CPC . B60L 1/003; B60L 11/1816; B60L 11/1824; B60L 11/184; B60L 11/1842; B60L 11/1844; B60L 11/1846; B60L 11/1848; B60L 11/185; B60L 11/1861; B60L 3/00; B60L 3/12; H01M 10/46; H02J 7/0055; Y02T 10/7005; Y02T 10/7044; Y02T 10/705; Y02T 10/7088; Y02T 10/7241; Y02T 90/121; Y02T 90/127; Y02T 90/128; Y02T 90/14; Y02T 90/16; Y02T 90/163; Y02T 90/169

USPC .............. 701/22; 307/9.1; 320/108, 109, 137, 320/138, 160
See application file for complete search history.

(56) References Cited

U.S. PATENT DOCUMENTS 6,114,833 A  *  9/2000  Langston et al. ............. 320/109
6,956,357 B2 * 10/2005  Nagai et al. .................. 320/148
(Continued)

FOREIGN PATENT DOCUMENTS

DE  20 2011 004 515 U1  12/2011
EP    2 384 922 A2  11/2011
JP    2008-234882 A  10/2008

OTHER PUBLICATIONS

German Office Action; dated Apr. 15, 2013, Patent Application No. 10 2012 216769.2.

Primary Examiner — Jason Holloway
Assistant Examiner — Rachid Bendidi
(74) Attorney, Agent, or Firm — Sughrue Mion, PLLC; Richard C. Turner (57) ABSTRACT

A power monitoring system includes an in-vehicle system that monitors a power state of a storage battery of an electric vehicle, and an out-of-vehicle system that is mounted on an out-of-vehicle apparatus and monitors power supply to the electric vehicle. The electric vehicle includes a first power feed port for supplying and receiving AC power to and from the out-of-vehicle apparatus, and a second power feed port for supplying and receiving DC power to and from the out-of-vehicle apparatus. The in-vehicle system includes first power feed port power measurement means for measuring a first amount of fed power supplied from the out-of-vehicle apparatus via the first power feed port, second power feed port power measurement means for measuring a second amount of fed power supplied from the out-of-vehicle apparatus via the second power feed port, vehicle side communication means, storage battery power measurement means, and a monitoring section.

7 Claims, 5 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *H02J 7/00* | (2006.01) | |
| *B60L 3/00* | (2006.01) | |
| *H01M 10/42* | (2006.01) | |
| *H01M 10/46* | (2006.01) | |
| *B60L 1/00* | (2006.01) | |
| *B60L 3/12* | (2006.01) | |
| *B60L 11/18* | (2006.01) | |
| *H01M 10/48* | (2006.01) | |
| *H01M 2/34* | (2006.01) | |

(52) U.S. Cl.
CPC .............. *B60L 11/184* (2013.01); *B60L 11/185* (2013.01); *B60L 11/1816* (2013.01); *B60L 11/1824* (2013.01); *B60L 11/1842* (2013.01); *B60L 11/1844* (2013.01); *B60L 11/1846* (2013.01); *B60L 11/1848* (2013.01); *B60L 11/1861* (2013.01); *H01M 10/42* (2013.01); *H01M 10/46* (2013.01); *B60L 2210/30* (2013.01); *B60L 2210/40* (2013.01); *B60L 2230/16* (2013.01); *B60L 2240/36* (2013.01); *H01M 2/34* (2013.01); *H01M 10/465* (2013.01); *H01M 10/48* (2013.01); *H01M 2220/20* (2013.01); *Y02E 60/721* (2013.01); *Y02T 10/7005* (2013.01); *Y02T 10/705* (2013.01); *Y02T 10/7044* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2001/0030843 A1* | 10/2001 | Takagi | 361/87 |
| 2008/0207163 A1* | 8/2008 | Shimizu | 455/404.2 |
| 2009/0079389 A1 | 3/2009 | Ohtomo | |
| 2011/0273139 A1 | 11/2011 | Hofheinz | |
| 2012/0249070 A1* | 10/2012 | Sellner et al. | 320/109 |

\* cited by examiner

| IN-VEHICLE POWER VARIATION ELEMENT | COOLING SYSTEM DEVICE | AIR CONDITIONER | AUDIO | · · · |
|---|---|---|---|---|
| OPERATION FLAG | 1 | 1 | 0 | · · · |
| RATED POWER | 1kw | 3kw | 0.1kw | · · · |

POWER MONITORING SYSTEM AND ELECTRIC VEHICLE

BACKGROUND OF THE INVENTION

1. Field of the Invention

The present invention relates to a power monitoring system for managing supply and reception of power between an electric vehicle such as an electric car and an out-of-vehicle apparatus.

2. Description of the Background Art

Electric vehicles (EV) include, for example, an electric car that obtains motive power by driving a motor using power charged in a secondary battery (hereinafter referred to as "battery") as a drive source thereof, and a plug-in hybrid electric vehicle (PHEV) that adopts an engine and a motor in combination. As a method for charging power to the battery of the EV, for example, there may be mentioned a method in which AC system power is supplied from a household socket or the like and the AC is converted into DC by an in-vehicle charger and then supplied to the battery, or a method in which DC power is directly supplied to the battery from an out-of-vehicle apparatus, such as a charging station, provided outside the vehicle EV.

Moreover, in recent years, a method has been considered in which, for an efficient utilization of renewable energy obtained by solar power generation, wind power generation, or the like, the renewable energy is utilized through a next-generation power network called a smart grid, and an EV is incorporated therein.

For example, it has been considered that excess power resulting from power generation of the renewable energy mentioned above is stored in the battery of the EV so that the stored power is utilized in a household or in a factory as necessary or is sold to a power company.

In a case of charging the EV or supplying power from the EV to the smart grid, the amount of power measured by the out-of-vehicle apparatus such as the charging station and the amount of power measured by the EV may be different from each other due to, for example, an abnormal condition such as power exploitation made by a malicious user or short-circuit of a cable. In such a case, there is a possibility that a trouble about a bill payment occurs.

In a method for measuring the amount of power in each of the out-of-vehicle apparatus and the EV, in general, the out-of-vehicle apparatus uses a power meter provided within the apparatus while the EV uses power information obtained from a battery management unit that is provided near the battery and constantly monitors a state of the battery.

In this method, however, the EV measures the power at a battery terminal. Therefore, no consideration is given to power consumption in the EV itself caused by, for example, operating equipments, such as an air conditioner and accessories, arranged between a power feed port of the EV and the battery terminal. Thus, a problem arises that a difference occurs between the amount of power measured in the out-of-vehicle apparatus and the amount of power measured in the EV.

A technique for solving such a problem is disclosed in, for example, Japanese Patent Application Laid-Open No. 2008-234882. In the technique disclosed in Japanese Patent Application Laid-Open No. 2008-234882, power meters are provided in both a power feed apparatus (out-of-vehicle apparatus) and an electric vehicle so that power measurement information of both of them are compared with each other.

SUMMARY OF THE INVENTION

An object of the present invention is to provide a power monitoring system and an electric vehicle that can remove inconsistency between the amount of power measured by an out-of-vehicle apparatus and the amount of power measured by an EV.

An aspect of a power monitoring system according to the present invention includes an in-vehicle system and an out-of-vehicle system. The in-vehicle system is mounted on an electric vehicle whose drive source is power charged in a driving storage battery, and the in-vehicle system monitors a power state of the driving storage battery. The out-of-vehicle system is mounted on an out-of-vehicle apparatus that supplies power to the electric vehicle, and the out-of-vehicle system monitors power supply to the electric vehicle. The electric vehicle includes a first power feed port for supplying and receiving AC power to and from the out-of-vehicle apparatus, and a second power feed port for supplying and receiving DC power to and from the out-of-vehicle apparatus. The in-vehicle system includes first power feed port power measurement means, second power feed port power measurement means, vehicle side communication means, storage battery power measurement means, and a monitoring section. The first power feed port power measurement means is for measuring a first amount of fed power supplied from the out-of-vehicle apparatus via the first power feed port. The second power feed port power measurement means is for measuring a second amount of fed power supplied from the out-of-vehicle apparatus via the second power feed port. The vehicle side communication means is for communicating with the out-of-vehicle apparatus. The storage battery power measurement means is for measuring an amount of charged power charged in the driving storage battery. The monitoring section controls the first and second power feed port power measurement means, the communication means, and the storage battery power measurement means. The out-of-vehicle apparatus includes a power feed port for supplying and receiving AC power and DC power to and from the electric vehicle. The out-of-vehicle system includes power feed port power measurement means, out-of-vehicle apparatus side communication means, and a control section. The power feed port power measurement means is connected to the power feed port, and for measuring an amount of supplied power supplied to the electric vehicle. The out-of-vehicle apparatus side communication means is for communicating with the electric vehicle. The control section controls the power feed port power measurement means and the vehicle side communication means. The control section causes the amount of supplied power measured by the power feed port power measurement means to be transmitted, as information, from the out-of-vehicle apparatus side communication means via the vehicle side communication means to the monitoring section. The monitoring section monitors supply and reception of power between the electric vehicle and the out-of-vehicle apparatus based on the first and second amount of fed power and the amount of supplied power transmitted as the information from the out-of-vehicle system, and also monitors power consumption in the electric vehicle based on the first and second amount of fed power and the amount of charged power.

In the power monitoring system described above, the supply and reception of power between the electric vehicle and the out-of-vehicle apparatus are monitored based on the first or second amount of fed power and the amount of supplied power transmitted from the out-of-vehicle system. Accordingly, an abnormality in a power feeding path, or the like, can be detected. Moreover, since the power consumption in the electric vehicle is monitored based on the first or second amount of fed power and the amount of charged power, the amount of power consumption consumed in the vehicle can be correctly calculated. Therefore, in a case of supplying the power in the driving storage battery to, for example, a smart grid, a control can be made such that the sum of the power supplied to the smart grid and the power consumed in the electric vehicle itself does not exceed a charge capacity of the driving storage battery. Thus, an excessive discharge is prevented, to make it possible to supply power from the electric vehicle to the smart grid.

Since the amount of power consumption consumed in the vehicle is correctly calculated, an abnormality in the electric vehicle can be detected and moreover, for example, in a case where the amount of power consumption exceeds a predetermined value, it can be determined that the power has not been normally fed, and thus the power feed can be stopped. This prevents occurrence of a trouble about a bill payment, which may otherwise be caused due to a difference between the amount of fed power supplied from the out-of-vehicle apparatus and the amount of charged power in the electric vehicle.

These and other objects, features, aspects and advantages of the present invention will become more apparent from the following detailed description of the present invention when taken in conjunction with the accompanying drawings.

DESCRIPTION OF THE PREFERRED EMBODIMENTS

<Preferred Embodiment 1>
<System Configuration>

Figure 1:
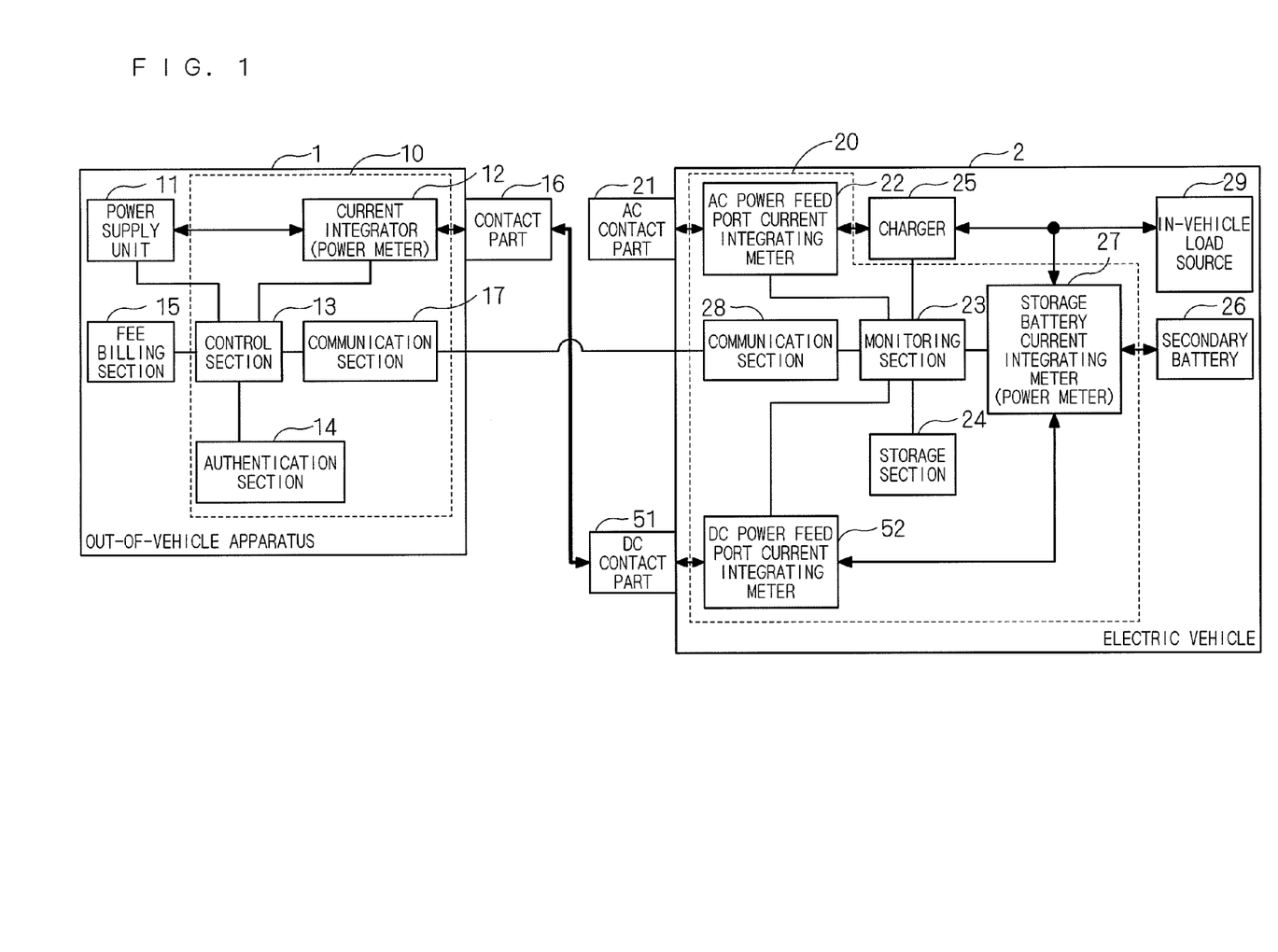
FIG. 1 is a block diagram showing a configuration of a power monitoring system for an electric vehicle according to a preferred embodiment 1 of the present invention.

FIG. 1 is a block diagram showing a configuration of a power monitoring system for an electric vehicle according to a preferred embodiment 1 of the present invention. The power monitoring system for the electric vehicle according to this preferred embodiment includes an out-of-vehicle system 10 mounted on an out-of-vehicle apparatus 1 and an in-vehicle system 20 mounted on an electric vehicle 2.

The electric vehicle 2 includes an AC contact part 21 (first power feed port), an AC power feed port current integrating meter (or AC power feed port power meter) 22, a charger 25, a secondary battery 26, a storage battery current integrating meter (or storage battery power meter) 27, a communication section 28, and an in-vehicle load source 29. The AC contact part 21 serves as an input/output part for AC power. The AC power feed port current integrating meter 22 serves as first power feed port power measurement means connected to the AC contact part 21. The charger 25 supplies and receives the AC power to and from the AC power feed port current integrating meter 22. The secondary battery 26 serves as a driving storage battery. The storage battery current integrating meter 27 serves as storage battery power measurement means for measuring power supplied to the secondary battery 26 and power discharged from the secondary battery 26. The communication section 28 serves as communication means for communicating with the out-of-vehicle apparatus 1. The in-vehicle load source 29 is a power load, such as an air conditioner, that consumes power in the vehicle.

The electric vehicle 2 also includes a DC contact part 51 (second power feed port) and a DC power feed port current integrating meter (or DC power feed port power meter) 52. The DC contact part 51 serves as an input/output part for DC power. The DC power feed port current integrating meter 52 serves as second power feed port power measurement means connected to the DC contact part 51.

The electric vehicle 2 also includes a monitoring section 23 and a storage section 24. The monitoring section 23 monitors and controls operations of the AC power feed port current integrating meter 22, the charger 25, the communication section 28, and the DC power feed port current integrating meter 52. The storage section 24 is connected to the monitoring section 23, and stores various information used for power monitoring.

The in-vehicle system 20 is configured to include the AC power feed port current integrating meter 22, the monitoring section 23, the storage section 24, the storage battery current integrating meter (or storage battery power meter) 27, the communication section 28, and the DC power feed port current integrating meter (or DC power feed port power meter) 52 described above.

The out-of-vehicle apparatus 1 includes a contact part 16, a current integrating meter (or power meter) 12 for AC and DC power, a power supply unit 11, a fee billing section 15, and a communication section 17. The current integrating meter serves as an input/output part for AC and DC power. The current integrating meter 12 is connected to the contact part 16. The power supply unit 11 serves as a supply source or a demand source of AC and DC power. The fee billing section 15 computes and bills a fee required for charging. The communication section 17 serves as communication means for communicating with the electric vehicle 2.

The out-of-vehicle apparatus 1 also includes a control section 13 and an authentication section 14. The control section 13 controls the power supply unit 11, the current integrating meter 12, the fee billing section 15, and the communication section 17. The authentication section 14 is connected to the control section 13, and authenticates ID information and the like.

The out-of-vehicle system 10 is configured to include the current integrating meter (or power meter) 12, the control section 13, the authentication section 14, and the communication section 17 described above.

The communication section 17 of the out-of-vehicle apparatus 1 and the communication section 28 of the electric vehicle 2 are connectable to each other through a cable such as a CAN (Controller Area Network) or a PLC (Power Line Communications), through a wire such as a power line, or through a wireless LAN or Bluetooth (registered trademark) not using a wire. Thereby, data for checking the amount of supplied power and the amount of charged power, data including bill information, error information, and the like, can be transmitted and received therebetween.

The contact part 16 of the out-of-vehicle apparatus 1 and the AC contact part 21 and the DC contact part 51 of the electric vehicle 2 are connected to each other through a cable such as a power line, or contactlessly connected to each other through electromagnetic induction. Thereby, power can be supplied from the out-of-vehicle apparatus 1 to the electric vehicle 2.

The power supply unit 11 is configured to supply general system power (AC) or DC power. In a case where the out-of-vehicle apparatus 1 is an apparatus that supplies AC power, the power supply unit 11 is an AC power source, and in a case where the out-of-vehicle apparatus 1 is, for example, a fast charging station that supplies DC power, the power supply unit 11 is a DC power source.

The current integrating meter (or power meter) 12 is a device for detecting the amount of power (the amount of supplied power) supplied to the electric vehicle 2. In a case of monitoring and integrating a current value, a current integrating meter is used, and in a case of monitoring and integrating a power value, a power meter is used. As the current integrating meter, a generally available product may be used, but it may be also acceptable that a simple ammeter is used to monitor a current and the control section 13 performs integration. Additionally, a voltmeter may be combined with the current integrating meter so that it can be used as a power meter that multiplies the current value by a voltage value to thereby convert into power.

A value detected by the current integrating meter (or power meter) 12 is given, as the amount of supplied power, to the control section 13.

The control section 13 is configured to determine a billing content (the total amount of supplied power, and the like) based on the amount of supplied power detected by the current integrating meter (or power meter) 12.

The control section 13 is also configured to transmit, via the communication section 17 to the electric vehicle 2, information of the amount of supplied power given from the current integrating meter (or power meter) 12

The control section 13 is also configured to control power supply performed by the power supply unit 11 based on the information. To be specific, the control section 13 obtains in advance, from the electric vehicle 2 via the communication section 17, information about a charge capacity and a remaining capacity of the secondary battery 26 of the electric vehicle 2 and information about whether the charging should be made to a full charge or to a predetermined amount, and controls the power supply so as to achieve a desired charge amount.

The authentication section 14 checks whether or not the electric vehicle 2 is a registered user entitled to receive a power feed from the out-of-vehicle apparatus 1. In a case where the electric vehicle 2 is the registered user, the authentication section 14 authenticates the electric vehicle 2, and in a case where the electric vehicle 2 is not the registered user, the authentication section 14 rejects the power feed. Whether or not the electric vehicle 2 is a registered user is determined by checking, for example, the ID information transmitted from the electric vehicle 2 via the communication section 17. Such a system is particularly effective when the out-of-vehicle apparatus 1 is an apparatus placed in a household or in an office, and effective when it is not desired to feed power to any vehicle other than a vehicle of a household member or a vehicle of a company member.

The fee billing section 15, after the charging of the secondary battery 26 is completed, computes and bills a fee required for the charging based on the billing content determined by the control section 13. In a case where the out-of-vehicle apparatus 1 is a fast charging station, a payment by cash, a payment by a prepaid card, and the like, can be selected for the billing. In a case where the out-of-vehicle apparatus 1 is an apparatus placed in an office, it is realistic that a debit from a payroll account of an owner of the electric vehicle 2 can be selected. Here, the bill information is notified to a corresponding financial agency via a communication network (not shown).

In a case where the out-of-vehicle apparatus 1 is an apparatus placed in a household, there is actually little point in billing. However, from the viewpoint of recognition of an expense of charging, the bill information may be presented.

The AC power feed port current integrating meter (or AC power feed port power meter) 22 of the electric vehicle 2 is configured to integrate the amount of AC power supplied to the electric vehicle 2 via the AC contact part 21, and output an integrated value, as fed power, to the monitoring section 23. Similarly to the current integrating meter (or power meter) 12 of the out-of-vehicle apparatus 1, in a case of monitoring and integrating a current value, a current integrating meter is used, and in a case of monitoring and integrating a power value, a power meter is used. It may be acceptable that a simple ammeter is used to monitor a current and the monitoring section 23 performs integration. Additionally, a voltmeter may be combined with the current integrating meter so that it can be used as a power meter that multiplies the current value by a voltage value to thereby convert into power.

The charger 25 includes an AC-DC converter for conversion into DC power in order that AC power supplied via the AC contact part 21 can be charged to the secondary battery 26, and also includes a DC-AC converter in order that the power of the secondary battery 26 can be supplied to the out-of-vehicle apparatus 1.

The in-vehicle load source 29 means a power load within the electric vehicle 2. For example, a cooling system device that is actuated in order to suppress a temperature rise in the secondary battery 26 during charging or an air conditioner that is used in order to cool a vehicle interior while charging is performed before traveling in summer, is operated during the charging. Therefore, the power supplied from the out-of-vehicle apparatus 1 is partially consumed in these in-vehicle load sources 29.

The DC power feed port current integrating meter (or DC power feed port power meter) 52 is configured to integrate the amount of DC power supplied to the electric vehicle 2 via the DC contact part 51, and output an integrated value, as information of the amount of fed power, to the monitoring section 23. Similarly to the current integrating meter (or power meter) 12 of the out-of-vehicle apparatus 1, in a case of monitoring and integrating a current value, a current integrating meter is used, and in a case of monitoring and integrating a power value, a power meter is used. It may be acceptable that a simple ammeter is used to monitor a current and the monitoring section 23 performs integration. Additionally, a voltmeter may be combined with the current integrating meter so that it can be used as a power meter that multiplies the current value by a voltage value to thereby convert into power.

The storage battery current integrating meter (or storage battery power meter) 27 is configured to integrate the amount of charge charged to the secondary battery 26, and output an integrated value, as the amount of charged power, to the monitoring section 23. Similarly to the current integrating meter (or power meter) 12 of the out-of-vehicle apparatus 1, in a case of monitoring and integrating a current value, a current integrating meter is used, and in a case of monitoring and integrating a power value, a power meter is used.

The storage section 24 stores, as registered user information, the ID information, and the like, that have been declared in advance by the registered user. When the electric vehicle 2 receives a power feed from the out-of-vehicle apparatus 1, upon a request from the control section 13 of the out-of-vehicle apparatus 1, the monitoring section 23 reads out the ID information and the like from the storage section 24, and transmits to the communication section 17 of the out-of-vehicle apparatus 1 with or without a wire.

The monitoring section 23 is configured to obtain the amount of charged power from the storage battery current integrating meter (or storage battery power meter) 27 and the amount of fed power from the AC power feed port current integrating meter (or power meter) 22 or the amount of fed power from the DC power feed port current integrating meter (or DC power feed port power meter) 52, and further obtain, via the communication section 28, the amount of supplied power transmitted from the out-of-vehicle apparatus 1. The monitoring section 23 is also configured to transmit, to the out-of-vehicle apparatus 1 via the communication section 28, information of the amount of charged power obtained from the storage battery current integrating meter (or storage battery power meter) 27.

The monitoring section 23 compares the amount of fed power and the amount of charged power obtained in the electric vehicle 2 with the amount of supplied power provided from the out-of-vehicle apparatus 1, and, based on a result of the comparison, monitors the presence or absence of an abnormality occurring in a power system between the out-of-vehicle apparatus 1 and the electric vehicle 2 or between the AC contact part 21 and the secondary battery 26 of the electric vehicle 2.

<Operation>

Next, an operation of the power monitoring system according to the present invention will be described using flowcharts shown in FIGS. 2 and 3 and with reference to FIG. 1.

Figure 2:
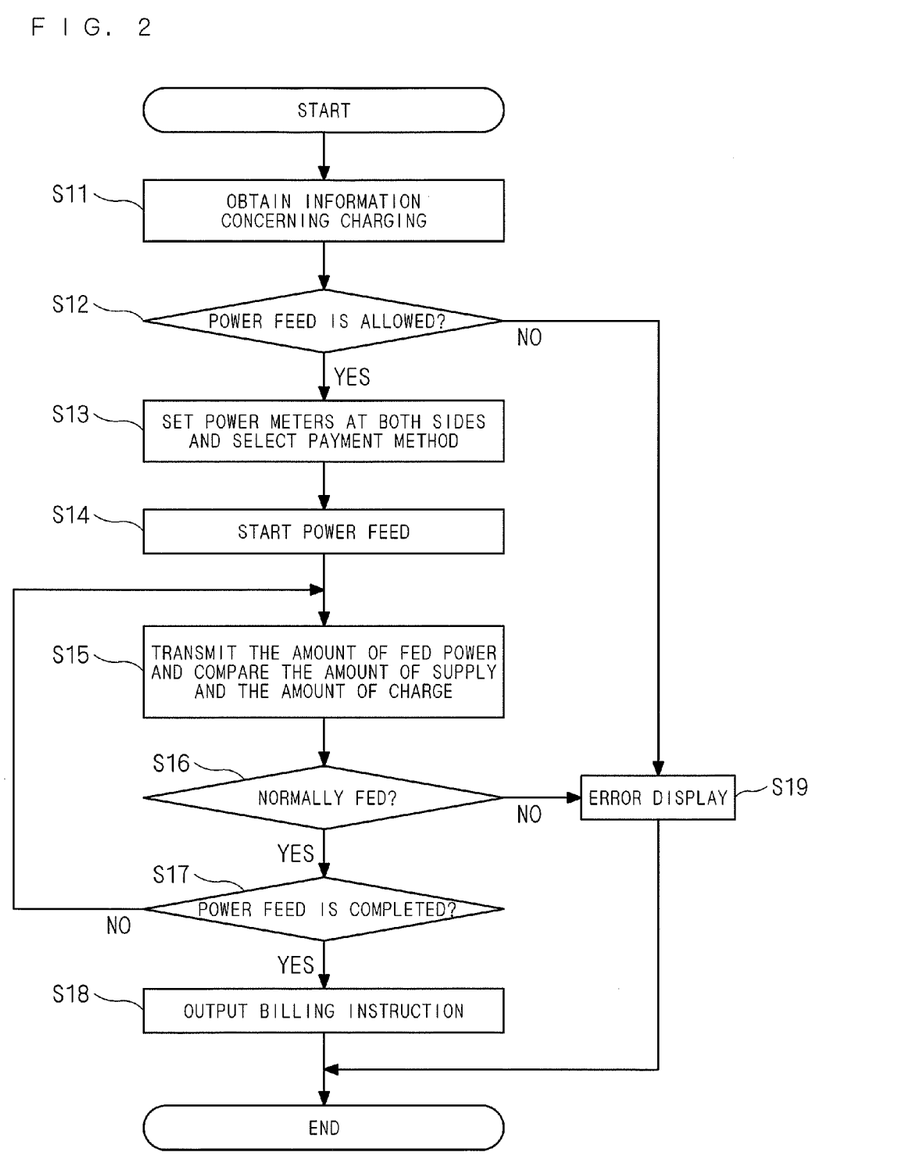
FIGS. 2 and 3 are flowcharts for explaining an operation of the power monitoring system for the electric vehicle according to the preferred embodiment 1 of the present invention.
Figure 3:
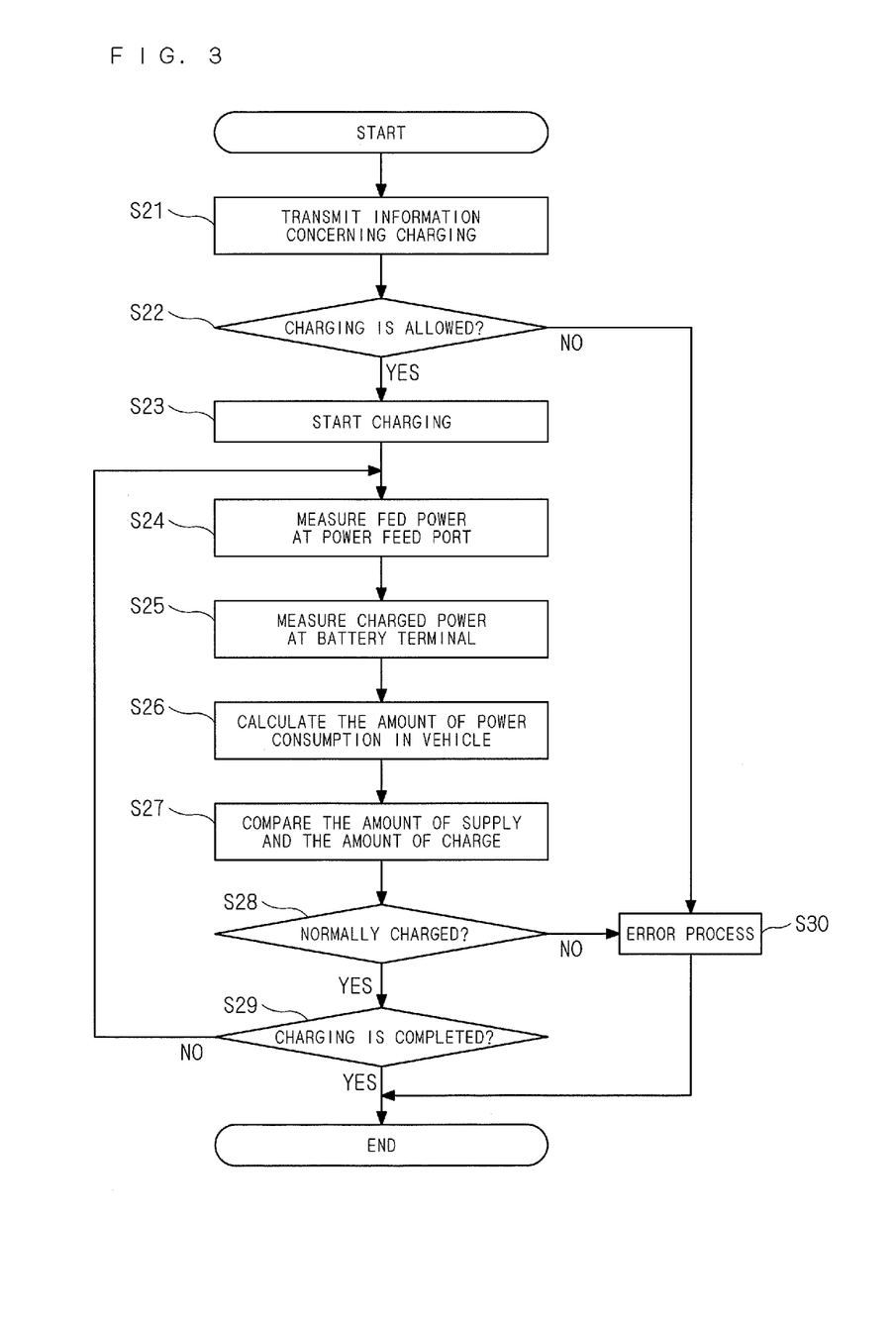

FIG. 2 is a flowchart for explaining an operation of the out-of-vehicle system 10 provided in the out-of-vehicle apparatus 1. The out-of-vehicle system 10, when connected to the electric vehicle 2, starts operating, and firstly in step S11, the communication section 17 obtains information concerning charging including information about the electric vehicle 2 such as the ID information indicating whether or not the electric vehicle 2 subscribes to this out-of-vehicle apparatus 1, and notifies the control section 13 of the information.

The control section 13 gives the obtained ID information, and the like, to the authentication section 14. The authentication section 14 determines whether or not the electric vehicle 2 is entitled to receive a power feed (step S12). To be specific, the authentication section 14 compares the ID information and the like that are registered in advance in the authentication section 14 with the ID information and the like of the electric vehicle 2 that are given from the control section 13, and determines whether or not they are coincident with each other.

If the authentication section 14 determines that the electric vehicle 2 is not entitled to receive a power feed, that is, if the authentication section 14 determines that the ID information, and the like, recorded in the storage section 24 of the electric vehicle 2 are not coincident with the ID information, and the like, registered in advance in the authentication section 14, the authentication section 14 notifies the control section 13 of it, and the control section 13 outputs, to the power supply unit 11, a control signal for disallowing or stopping charging. Then, the process moves to step S19.

In step S19, the control section 13 presents an error display indicating that the electric vehicle 2 is a vehicle not entitled to receive a power feed, on a display section (such as a display apparatus in an operation panel, not shown) that is display means of the out-of-vehicle system 10.

On the other hand, if the authentication section 14 determines that the electric vehicle 2 is entitled to receive a power feed, that is if the authentication section 14 determines that the ID information, and the like, recorded in the storage section 24 of the electric vehicle 2 are coincident with the ID information, and the like, registered in advance in the authentication section 14, the authentication section 14 notifies the control section 13 of it, and the control section 13 outputs a control signal for allowing charging to the power supply unit 11. Then, the process moves to step S13.

In step S13, for example, setting is made for adjusting an error between the power meters of the out-of-vehicle apparatus 1 and the electric vehicle 2 which are, in this case, the current integrating meter (or power meter) 12 of the out-of-vehicle apparatus 1 and the AC power feed port current integrating meter (or power meter) 22 or the DC power feed port current integrating meter (or DC power feed port power meter) 52 of the electric vehicle 2, and a selection of a payment method is also performed for selecting, for example, whether a bill payment is a payment by cash or a payment by a prepaid card, based on an instruction given from a user.

In a case where the out-of-vehicle apparatus 1 is an apparatus placed in a household, the selection of the payment method may be omitted. After the setting of the power meters at both sides and the selection of the bill payment method are completed, the process moves to step S14.

In step S14, the control section 13 controls the power supply unit 11 to start a power feed to the electric vehicle 2, and then the process moves to step S15.

In step S15, the control section 13 transmits, to the electric vehicle 2 via the communication section 17, the amount of power supply detected by the current integrating meter (or power meter) 12, as information of the amount of fed power. The control section 13 also compares the amount of supplied power detected by the current integrating meter (or power meter) 12 with the amount of charged power included in the information of the amount of charged power that is transmitted from the electric vehicle 2 via the communication section 17.

The control section 13 determines whether or not the electric vehicle 2 has been normally fed with power, based on a result of the comparison (step S16). More specifically, the control section 13 determines whether or not a difference or a ratio between the amount of supplied power and the amount of charged power is equal to or less than a predetermined value that has been set in advance. If the difference exceeds the predetermined value, it is determined that there is a problem in a power feeding path between the out-of-vehicle apparatus 1 and the electric vehicle 2 or there is a possibility that an abnormality such as short-circuit occurs in an electrical path within the electric vehicle 2. Thus, the control section 13 presents the error display indicating that the power feed has not been normally performed, on the display section (such as a display apparatus in an operation panel, not shown) that is the display means of the out-of-vehicle system 10 (step S19). This predetermined value is defined as, for example, the ratio of the difference between the amount of supplied power and the amount of charged power relative to the amount of supply. The setting is made such that, for example, the error display is presented when the value exceeds 10%. In a case where the predetermined value is defined as the percentage of the ratio between the amount of supplied power and the amount of charged power, the setting is made such that, for example, the error display is presented when the value falls below 90%.

If, in step S16, it is determined that the electric vehicle 2 has been normally fed with power, that is, if the difference or the ratio between the amount of supplied power detected by the current integrating meter (or power meter) 12 and the amount of charged power included in the information of the amount of charged power that is transmitted from the electric vehicle 2 via the communication section 17 is equal to or less than the predetermined value, the process moves to step S17.

In step S17, whether or not a power feed completion instruction has been received from the user, or whether or not the secondary battery 26 is charged to the full charge (or to the predetermined amount) is detected, and thereby whether or not the power feed should be completed is determined. If it is determined that the power feed should not be completed, step S15 and subsequent steps are repeated. That is, in a case where the user has instructed completion of the power feed through the operation panel (not shown) of the out-of-vehicle system 10 or in a case where the amount of charged power of the secondary battery 26 included in the information of the amount of charged power that is transmitted from the electric vehicle 2 via the communication section 17 has reached the full charge (or the predetermined amount), it is determined that the power feed should be completed, and in the other cases, the power feed is continued. Here, the control section 13 has already obtained, from the electric vehicle 2 via the communication section 17, the information about whether the secondary battery 26 of the electric vehicle 2 should be charged to the full charge or to the predetermined amount, at the time when the out-of-vehicle system 10 was connected to the electric vehicle 2.

If, in step S17, it is determined that the power feed should be completed, the process moves to step S18.

In step S18, the control section 13 determines the billing content, and outputs a billing instruction to the fee billing section 15. The fee billing section 15 computes the fee required for charging the secondary battery 26 based on the billing content determined by the control section 13. Then, the billing is performed, and thus the process at the out-of-vehicle apparatus 1 side is completed. If the power feed has not been normally performed and the error display is presented (step S19), no billing is performed, and thus the process at the out-of-vehicle apparatus 1 side is completed.

In this case, the difference between the amount of supplied power detected by the current integrating meter (or power meter) 12 and the amount of charged power included in the information of the amount of charged power that is transmitted from the electric vehicle 2 via the communication section 17 is small. Therefore, the total amount of supplied power may be calculated based on the amount of supplied power detected by the current integrating meter (or power meter) 12, and the total amount of supplied power thus calculated may be set as the billing content. The fee billing section 15 performs the billing by multiplying the total amount of supplied power by a unit electricity price. In a case where the out-of-vehicle system 10 is a fast charging station, for example, a value including a cost of handling the out-of-vehicle system 10 and a benefit may be set as the unit electricity price.

Next, an operation of the in-vehicle system 20 provided in the electric vehicle 2 will be described with reference to the flowchart shown in FIG. 3.

The in-vehicle system 20, when connected to the out-of-vehicle apparatus 1, starts operating, and firstly in step S21, the monitoring section 23 reads out, from the storage section 24, information concerning charging including information about the own vehicle (electric vehicle 2) such as the ID information necessary for the determination of whether or not the electric vehicle 2 subscribes to the out-of-vehicle apparatus 1, and outputs the information via the communication section 28, and notifies the control section 13 of the information via the communication section 17.

Then, the authentication section 14 of the out-of-vehicle apparatus 1 determines whether or not the electric vehicle 2 is a vehicle entitled to receive a power feed. The control section 13 transmits a result of the determination via the communication section 17, and the monitoring section 23 receives the result of the determination via the communication section 28.

In step S22, whether or not a power feed is allowed as a result of the determination in the out-of-vehicle apparatus 1, that is, whether or not charging from the out-of-vehicle apparatus 1 is allowed, is checked. If a result of the checking is that charging from the out-of-vehicle apparatus 1 is not allowed, the monitoring section 23 pauses the process, and the process moves to step S30.

In step S30, the monitoring section 23 performs an error process such as setting a flag indicating that charging from the out-of-vehicle apparatus 1 is not allowed or storing the error information.

If, in step S22, the result of the checking is that charging from the out-of-vehicle apparatus 1 is allowed, in a case where the out-of-vehicle apparatus 1 is an apparatus that supplies AC power, the monitoring section 23 outputs, to the charger 25, a control signal for starting charging, and the process moves to step S23. In a case where the out-of-vehicle apparatus 1 is, for example, a fast charging station that supplies DC power, the process immediately moves to step S23.

In step S23, in a case where the out-of-vehicle apparatus 1 is an apparatus that supplies AC power, the charger 25 having received the control signal for starting charging drives a control circuit for converting AC power supplied from the out-of-vehicle apparatus 1 into DC power for charging the secondary battery 26, to start charging. Then, the process moves to step S24. In a case where the out-of-vehicle apparatus 1 is, for example, a fast charging station that supplies DC power, charging is immediately started.

In step S24, in a case where AC power is supplied from the out-of-vehicle apparatus 1, the monitoring section 23 measures the amount of fed power supplied to the AC contact part 21 by means of the AC power feed port current integrating meter (or AC power feed port power meter) 22, and in a case where DC power is supplied from the out-of-vehicle apparatus 1, the monitoring section 23 measures the amount of fed power supplied to the DC contact part 51 by means of the DC power feed port current integrating meter (or DC power feed port power meter) 52 Then, the measured amount is obtained as the information of the amount of fed power, and the process moves to step S25.

In step S25, the monitoring section 23 measures the amount of charged power (the amount of charged power in a battery terminal) charged in the secondary battery 26 by means of the storage battery current integrating meter (or storage battery power meter) 27. Then, the process moves to step S26.

In step S26, in a case where AC power is supplied from the out-of-vehicle apparatus 1, the monitoring section 23 calculates the amount of power consumption consumed in the in-vehicle load source 29 based on a difference between the amount of fed power detected by the AC power feed port current integrating meter (or AC power feed port power meter) 22 and the amount of charged power detected by the storage battery current integrating meter (or storage battery power meter) 27. Then, the process moves to step S27. In a case where DC power is supplied from the out-of-vehicle apparatus 1, this process step is not performed and the process moves to step S27.

In step S27, the monitoring section 23 compares the amount of fed power detected by the AC power feed port current integrating meter (or AC power feed port power meter) 22 or by the DC power feed port current integrating meter (or DC power feed port power meter) 52 with the amount of supplied power included in the information of the amount of fed power that is transmitted from the out-of-vehicle apparatus 1 via the communication section 28. Then, the process moves to step S28.

In step S28, the monitoring section 23 determines whether or not power has been normally fed from the out-of-vehicle apparatus 1 based on a result of the comparison between the above-described amount of supplied power and the above-described amount of charged power. More specifically, the monitoring section 23 determines whether or not the difference between the amount of supplied power and the amount of charged power is equal to or less than a predetermined value (first predetermined value) that has been set in advance. If the difference exceeds the predetermined value, it is determined that there is a problem between the out-of-vehicle apparatus 1 and the electric vehicle 2. Thus, an error process is performed such as setting a flag indicating that power has not been normally fed or storing the error information (step S30). This predetermined value is defined as, for example, the percentage of the difference between the amount of supply and the amount of charge relative to the amount of supply. The setting is made such that, for example, the error display is presented when the value exceeds 10%.

In step S28, in a case where AC power is supplied from the out-of-vehicle apparatus 1, whether or not the fed power is normally charged in the secondary battery 26 is also determined. To be specific, whether or not the amount of power consumption defined as the difference between the amount of fed power and the amount of charged power calculated in step S26 is equal to or lower than a predetermined value (second predetermined value) that has been set in advance is determined. If the difference exceeds the predetermined value, it is determined that there is a possibility that an abnormality such as short-circuit occurs in an electrical path within the electric vehicle 2. Thus, the error process is performed such as setting the flag indicating that power has not been normally fed or storing the error information (step S30). This predetermined value is defined as, for example, the percentage of the amount of power consumption relative to the amount of fed power, and the setting is made such that, for example, the error display is presented when the value exceeds 10%.

On the other hand, if, in step S28, the difference between the amount of supplied power and the amount of charged power is equal to or less than the predetermined value that has been set in advance or if the amount of power consumption is equal to or less than the predetermined value that has been set in advance, it is determined that the power has been normally fed. Then, the process moves to step S29.

In step S29, the monitoring section 23 detects whether or not a power feed completion instruction is received from the user or whether or not the secondary battery 26 has reached the full charge (the predetermined amount), and thereby determines whether or not the power feed should be completed. If it is determined that the power feed should not be completed, step S24 and subsequent steps are repeated. That is, in a case where the user has instructed completion of the power feed through the operation panel (not shown) within the vehicle or in a case where the amount of charge in the secondary battery 26 has reached the full charge (the predetermined amount), it is determined that the power feed should be completed, and in the other cases, the power feed is continued. Here, whether the secondary battery 26 of the electric vehicle 2 should be charged to the full charge or to the predetermined amount may be set in advance by a charge system of the electric vehicle 2, or alternatively may be set by the user through the operation panel (not shown) within the vehicle.

If, in step S29, it is determined that the charging should be completed, in a case where AC power is supplied from the out-of-vehicle apparatus 1, the monitoring section 23 outputs a charge control stop instruction to the charger 25. Thus, the process at the electric vehicle 2 side is completed. In a case where DC power is supplied from the out-of-vehicle apparatus 1, the charge control stop instruction is given from the communication section 28 to the control section 13 via the communication section 17 of the electric vehicle 2. Thus, the process at the electric vehicle 2 side is completed.

The control section 13 receives the charge control stop instruction, and then controls the power supply unit 11 so as to stop the power output.

Also when the in-vehicle system 20 performs the error process in step S30, in a case where AC power is supplied from the out-of-vehicle apparatus 1, the charge control stop instruction is outputted to the charger 25, and in a case where DC power is supplied from the out-of-vehicle apparatus 1, the charge control stop instruction is given from the communication section 28 to the control section 13 via the communication section 17 of the electric vehicle 2. Thus, the process at the electric vehicle 2 side is completed.

<Effects>

As described above, in the power monitoring system for the electric vehicle according to the preferred embodiment 1, the amount of power consumption consumed in the in-vehicle load source 29 can be correctly calculated based on the difference between the amount of fed power detected by the AC power feed port current integrating meter (or AC power feed port power meter) 22 and the amount of charged power detected by the storage battery current integrating meter (or storage battery power meter) 27.

Then, whether or not the amount of power consumption is equal to or less than the predetermined value that has been set in advance is determined. If the difference exceeds the predetermined value, it is determined that the power has not been normally fed, and the error process is performed to stop the power feed. This prevents occurrence of a trouble about a bill payment, which may otherwise be caused due to a difference between the amount of fed power detected by the current integrating meter (or power meter) 12 of the out-of-vehicle apparatus 1 and the amount of charged power detected by the storage battery current integrating meter (or storage battery power meter) 27.

If the difference between the amount of fed power detected by the AC power feed port current integrating meter (or AC power feed port power meter) 22 or by the DC power feed port current integrating meter (or DC power feed port power meter) 52 and the amount of supplied power detected by the out-of-vehicle apparatus 1 exceeds the predetermined value, it can be determined that there is a problem between the out-of-vehicle apparatus 1 and the electric vehicle 2, and an abnormality in the power feeding path, or the like, can be detected.

Since the AC power feed port current integrating meter (or AC power feed port power meter) 22 and the DC power feed port current integrating meter (or DC power feed port power meter) 52 are provided, the current at the power feed port can be measured not only for AC power but also for DC power. Thus, an abnormality can be detected in both an AC power feeding path and a DC power feeding path.

The out-of-vehicle apparatus 1 determines whether or not the difference or the ratio between the amount of supplied power detected by the current integrating meter (or power meter) 12 and the amount of charged power transmitted from the electric vehicle 2 via the communication section 17 is equal to or less than the predetermined value that has been set in advance. If the difference or the ratio exceeds the predetermined value, the error display is presented. In a case where the error display is presented, no billing is performed. This prevents occurrence of a trouble about a bill payment, which may otherwise be caused due to a difference between the amount of fed power detected by the current integrating meter (or power meter) 12 of the out-of-vehicle apparatus 1 and the amount of charged power detected by the storage battery current integrating meter (or storage battery power meter) 27.

In the power monitoring system for the electric vehicle according to the preferred embodiment 1, for an efficient utilization of renewable energy in a smart grid or for a power peak shift, the secondary battery 26 of the electric vehicle 2 can be used as temporary storage means or an emergency power source in case of a disaster. That is, in a case where the secondary battery 26 is used as temporary storage means, it suffices that the same operation as in the preferred embodiment 1 described above is performed. In this case, no billing is performed. In a case where the secondary battery 26 is used as an emergency power source in case of a disaster, the monitoring section 23 of the electric vehicle 2 controls discharging of the secondary battery 26, and supplies the power in the secondary battery 26 to the out-of-vehicle apparatus 1. Accordingly, the DC-AC converter of the charger 25 is controlled to perform DC-AC conversion, and AC power is supplied from the AC power feed port current integrating meter (or AC power feed port power meter) 22 via the AC contact part 21 to the out-of-vehicle apparatus 1.

In another possible configuration, DC power outputted from the secondary battery 26 is supplied to the out-of-vehicle apparatus 1 via the DC power feed port current integrating meter (or DC power feed port power meter) 52 and the DC contact part 51. In this case, providing a DC-AC converter in the out-of-vehicle apparatus 1 makes this configuration applicable also to a case where the power supply unit 11 is an ordinary AC power system.

In these cases, the monitoring section 23 recognizes the charge capacity and the remaining capacity of the secondary battery 26, and controls discharging of the secondary battery 26 so as to avoid an excessive discharge.

Moreover, the amount of power consumption consumed in the in-vehicle load source 29 can be correctly calculated. Accordingly, in a case of supplying the power in the secondary battery 26 to the smart grid, a control can be made such that the sum of the power supplied to the smart grid and the power consumed in the electric vehicle 2 itself does not exceed the charge capacity of the secondary battery 26. Thus, an excessive discharge is prevented.

In this manner, in the power monitoring system for the electric vehicle according to the preferred embodiment 1, it is also possible to supply power from the electric vehicle 2 to the smart grid.

<Preferred Embodiment 2>

Figure 4:
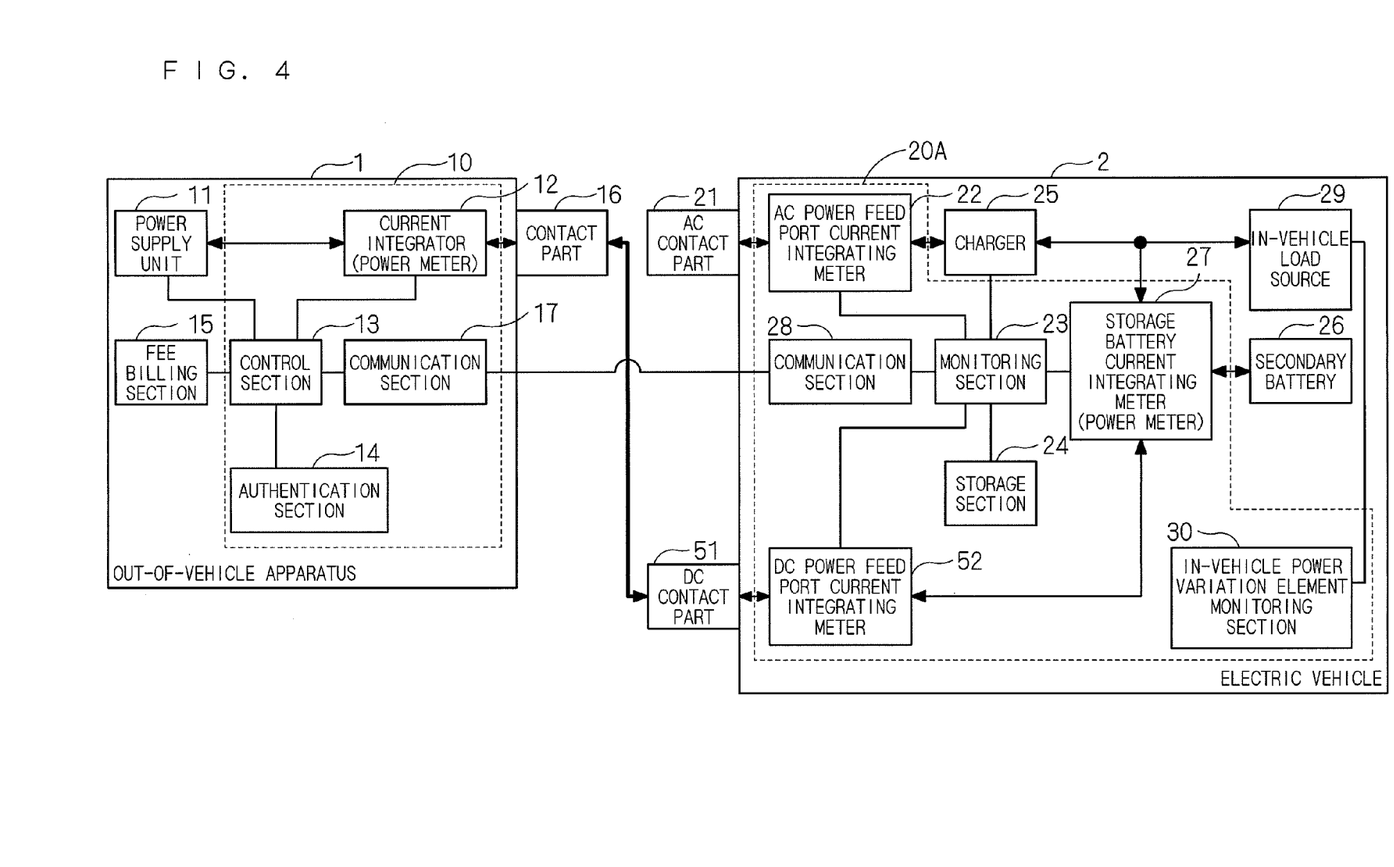
FIG. 4 is a block diagram showing a configuration of the power monitoring system for the electric vehicle according to the preferred embodiment 1 of the present invention.

FIG. 4 is a block diagram showing a configuration of a power monitoring system for an electric vehicle according to a preferred embodiment 2 of the present invention. The power monitoring system for the electric vehicle according to this preferred embodiment includes the out-of-vehicle system 10 mounted on the out-of-vehicle apparatus 1 and an in-vehicle system 20A mounted on the electric vehicle 2. The same parts of the configuration as those of the power monitoring system of the preferred embodiment 1 shown in FIG. 1 are denoted by the same reference numerals, and a redundant description is omitted.

The in-vehicle system 20A is configured to include the AC power feed port current integrating meter 22, the monitoring section 23, the storage section 24, the storage battery current integrating meter (or storage battery power meter) 27, the communication section 28, the DC power feed port current integrating meter (or DC power feed port power meter) 52, and an in-vehicle power variation element monitoring section 30.

The in-vehicle power variation element monitoring section 30 has a function for constantly monitoring an operating status of the in-vehicle load source 29 that is a power variation element existing in the vehicle and for notifying the monitoring section 23 of a power variation value in accordance with the operation of the in-vehicle load source 29.

Figure 5:
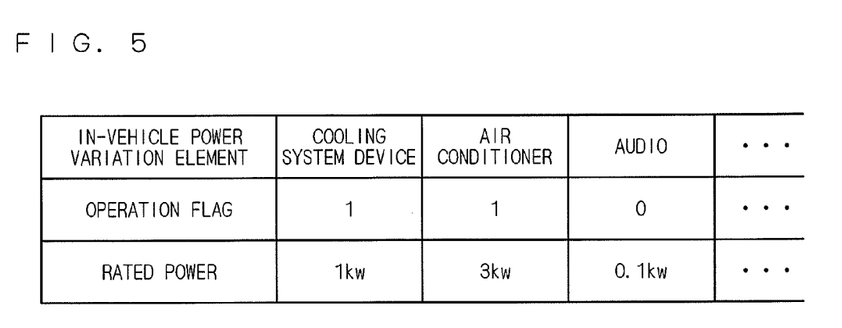
FIG. 5 is a diagram illustrating what is monitored by an in-vehicle power variation element monitoring section.

Here, an example of what is monitored by the in-vehicle power variation element monitoring section 30 will be described with reference to FIG. 5. In FIG. 5, the in-vehicle power variation element, the rated power thereof, and an operation flag are shown. The operation flag set to be 1 indicates an operating state, and the operation flag set to be 0 indicates a stopped state.

In FIG. 5, a cooling system device for a battery, an air conditioner, and an audio are shown as examples of the in-vehicle power variation element. The rated powers of the cooling system device for a battery, the air conditioner, and the audio are 1 kW, 3 kW, and 0.1 kW, respectively.

The in-vehicle power variation element monitoring section 30 calculates a total value of the rated powers of the power variation elements whose operating state flags are 1, that is, a total value of the rated powers of the power variation elements that are operating. Then, the in-vehicle power variation element monitoring section 30 notifies the monitoring section 23 of the total value.

In step S28 described above with reference to FIG. 3, the monitoring section 23 compares the amount of power consumption defined as the difference between the amount of fed power and the amount of charged power with the total value of the rated powers, and if the amount of power consumption exceeds the total value of the rated powers, the monitoring section 23 determines that there is a possibility of occurrence of an abnormality such as short-circuit in an electrical path within the electric vehicle 2.

In this manner, each of the variation elements that varies the power consumed within the vehicle is monitored, and thereby the amount of power consumption within the vehicle can be more correctly monitored.

In the preferred embodiments 1 and 2 described above, whether or not the power has been normally fed is determined based on the difference between the amount of fed power detected by the AC power feed port current integrating meter (or AC power feed port power meter) 22 or by the DC power feed port current integrating meter (or DC power feed port power meter) 52 and the amount of supplied power detected by the out-of-vehicle apparatus 1. However, even in a case of determining it based on the ratio therebetween, the same effects are obtained.

The presence or absence of an abnormality in an electrical path within the electric vehicle 2 is determined based on the difference between the amount of fed power detected by the AC power feed port current integrating meter (or AC power feed port power meter) 22 and the amount of charged power detected by the storage battery current integrating meter (or storage battery power meter) 27. However, even in a case of determining it based on the ratio therebetween, the same effects are obtained.

In the example shown above, if, in step S28 described with reference to FIG. 3, it is determined that the power has not been normally fed, the error process is performed in step S30. However, a configuration for notifying an out-of-vehicle apparatus or a user of the error, such as notifying the out-of-vehicle apparatus 1 of the error via the communication section 28, may be used in combination. This configuration enables the user to recognize that the power has not been normally fed.

Moreover, in a case where it is determined that the power has not been normally fed, for example, if abnormal power is supplied to the secondary battery 26 or abnormal power is discharged to the outside of the vehicle, such a configuration may be used in combination that the monitoring section 23 controls an electromagnetic contactor or an electromagnetic circuit breaker, that is called a contactor, provided in the power line connected to the secondary battery 26 so that the power line is opened to thereby forcibly block the power. This configuration prevents application of a load to the secondary battery 26 and an influence on the outside of the vehicle.

The preferred embodiments of the present invention may be appropriately modified or omitted without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A power monitoring system comprising:
an in-vehicle system mounted on an electric vehicle whose drive source is power charged in a driving storage battery, said in-vehicle system monitoring a power state of said driving storage battery; and
an out-of-vehicle system mounted on an out-of-vehicle apparatus that supplies power to said electric vehicle, said out-of-vehicle system monitoring power supply to said electric vehicle,
wherein
said electric vehicle includes a first power feed port for supplying and receiving AC power to and from said out-of-vehicle apparatus, and a second power feed port for supplying and receiving DC power to and from said out-of-vehicle apparatus,
said in-vehicle system includes:
first power feed port power meter configured to measure a first amount of fed power supplied from said out-of-vehicle apparatus via said first power feed port;
second power feed port power meter configured to measure a second amount of fed power supplied from said out-of-vehicle apparatus via said second power feed port;
a vehicle side communicator configured to communicate with said out-of-vehicle apparatus;
storage battery power meter configured to measure an amount of charged power charged in said driving storage battery; and
a monitoring section that controls said first and second power feed port power meter, said vehicle side communicator, and said storage battery power meter,
said out-of-vehicle apparatus includes a power feed port for supplying and receiving AC power and DC power to and from said electric vehicle,
said out-of-vehicle system includes:
power feed port power meter connected to said power feed port, the power feed port power meter being configured to measure an amount of supplied power supplied to said electric vehicle;
out-of-vehicle apparatus side communicator configured to communicate with said electric vehicle; and
a control section that controls said power feed port power meter and said vehicle side communicator,
said control section causes said amount of supplied power measured by said power feed port power meter to be transmitted, as information, from said out-of-vehicle apparatus side communicator via said vehicle side communicator to said monitoring section,
said monitoring section monitors supply and reception of power between said electric vehicle and said out-of-vehicle apparatus based on said first and second amount of fed power and said amount of supplied power transmitted as the information from said out-of-vehicle system, and also monitors power consumption in said electric vehicle based on said first and second amount of fed power and said amount of charged power.

2. The power monitoring system according to claim 1, wherein
said monitoring section of said in-vehicle system determines presence or absence of an abnormality between said first or second power feed port of said electric vehicle and said power feed port of said out-of-vehicle apparatus based on a difference or a ratio between said first or second amount of fed power and said amount of supplied power,
said monitoring section of said in-vehicle system determines presence or absence of an abnormality in said electric vehicle based on a difference or a ratio between said first or second amount of fed power and said amount of charged power.

3. The power monitoring system according to claim 1, wherein
said monitoring section of said in-vehicle system causes said amount of charged power to be transmitted, as information, from said vehicle side communicator via said out-of-vehicle apparatus side communicator to said control section of said out-of-vehicle system,
said control section determines presence or absence of an abnormality in a power feed to said electric vehicle based on a difference or a ratio between said amount of supplied power and said amount of charged power transmitted from said in-vehicle system.

4. The power monitoring system according to claim 1, wherein
said in-vehicle system further includes a in-vehicle power variation element monitoring section that monitors an operating status of an in-vehicle load source that is a power variation element in said electric vehicle and notifies said monitoring section of a total value of a rated power of said in-vehicle load source during an operation thereof,
said monitoring section compares an amount of power consumption defined as a difference between said first or second amount of fed power and said amount of supplied power with said total value of the rated power, and determines presence or absence of an abnormality in said electric vehicle based on whether or not said amount of power consumption exceeds said total value of the rated power.

5. The power monitoring system according to claim 1, wherein
in a case where an abnormality is detected by the monitoring of supply and reception of power between said electric vehicle and said out-of-vehicle apparatus and the monitoring of power consumption in said electric vehicle, said monitoring section of said in-vehicle system notifies said out-of-vehicle apparatus of the detection of an abnormality via said vehicle side communicator.

6. The power monitoring system according to claim 1, wherein
in a case where an abnormality is detected by the monitoring of supply and reception of power between said electric vehicle and said out-of-vehicle apparatus and the monitoring of power consumption in said electric vehicle, said monitoring section of said in-vehicle system controls blocking means provided in a power line connected to said driving storage battery so that said power line is opened to thereby forcibly block power.

7. An electric vehicle whose drive source is power charged in a driving storage battery, said electric vehicle comprising:
an in-vehicle system that monitors a power state of said driving storage battery; and
a first power feed port for supplying and receiving AC power to and from an out-of-vehicle apparatus that supplies power, and a second power feed port for supplying and receiving DC power to and from said out-of-vehicle apparatus,
wherein
said in-vehicle system includes:
first power feed port power meter configured to measure a first amount of fed power supplied from said out-of-vehicle apparatus via said first power feed port;
second power feed port power meter configured to measure a second amount of fed power supplied from said out-of-vehicle apparatus via said second power feed port;
vehicle side communicator configured to communicate with said out-of-vehicle apparatus;
storage battery power meter configured to measure an amount of charged power charged in said driving storage battery; and
a monitoring section that controls said first and second power feed port power meter, said vehicle side communicator, and said storage battery power meter,
said monitoring section monitors supply and reception of power between said electric vehicle and said out-of-vehicle apparatus based on said first or second amount of fed power and the amount of supplied power transmitted, as information, from said out-of-vehicle apparatus via said vehicle side communicator, and also monitors power consumption in said electric vehicle based on said first or second amount of fed power and said amount of charged power.

* * * * *